United States Patent [19]
Skutecki

[11] Patent Number: 4,481,586
[45] Date of Patent: Nov. 6, 1984

[54] ADAPTIVE WASHOUT CIRCUIT FOR USE IN A STABILITY AUGMENTATION SYSTEM

[75] Inventor: Edmund R. Skutecki, Glendale, Ariz.

[73] Assignee: Sperry Corporation, New York, N.Y.

[21] Appl. No.: 356,549

[22] Filed: Mar. 9, 1982

[51] Int. Cl.³ .................... G06F 15/50; G06G 7/78
[52] U.S. Cl. ............................ 364/434; 364/432; 244/3.21; 244/164
[58] Field of Search ........... 364/434, 435, 432, 433, 364/440; 244/3.21, 17.13, 164, 165, 171

[56] References Cited

U.S. PATENT DOCUMENTS

| | | | |
|---|---|---|---|
| 3,752,420 | 8/1973 | Osder | 244/3.21 |
| 4,012,018 | 3/1977 | Lorell et al. | 244/3.21 |
| 4,071,211 | 1/1978 | Muhlfelder et al. | 364/434 |
| 4,095,271 | 6/1978 | Muller | 364/434 |
| 4,106,094 | 8/1978 | Land | 364/434 |
| 4,129,275 | 12/1978 | Gerstine et al. | 244/17.13 |
| 4,277,041 | 7/1981 | Marrs et al. | 364/440 |
| 4,294,420 | 10/1981 | Broquet | 244/171 |
| 4,382,283 | 5/1983 | Clelford et al. | 364/434 |
| 4,383,299 | 5/1983 | Fischer et al. | 364/434 |
| 4,385,356 | 5/1983 | Verzella et al. | 364/434 |

FOREIGN PATENT DOCUMENTS 2081474A 2/1982 United Kingdom.

OTHER PUBLICATIONS

J. Blakelock, *Automatic Control of Aircraft and Missiles*, J. Wiley & Son, Inc., N.Y. 1965, pp. 138–139.
*Airplane Flight Dynamics and Automatic Flight Controls*, Roskam Aviation and Engineering Corp., Kansas, 1979, pp. 946–948 & 1087.

*Primary Examiner*—Charles E. Atkinson
*Assistant Examiner*—Gary V. Harkcom
*Attorney, Agent, or Firm*—Howard P. Terry

[57] ABSTRACT

A stability augmentation system utilizing a limited authority series actuator has an adaptive washout circuit which automatically reduces the effective washout system washout time constant as a function of attitude error or series actuator displacement. For small errors and for disturbances due to gusting winds, the system washout time constants are slow, thus providing good stability. For large errors the circuit smoothly reduces the time constants to keep the series actuators from saturating.

12 Claims, 2 Drawing Figures

ADAPTIVE WASHOUT CIRCUIT FOR USE IN A STABILITY AUGMENTATION SYSTEM

BACKGROUND OF THE INVENTION

1. Field of the Invention

The invention relates to control systems for navigable craft particularly with regard to flight control systems for aircraft utilizing stability augmentation systems (SAS). More specifically the invention relates to a circuit for automatically recentering the series actuator of the SAS by varying the washout time constant as a function of attitude error.

2. Description of the Prior Art

Prior art automatic pilots are known that utilize stability augmentation systems (SAS) for providing short term stability augmentation about the various axes of the aircraft. Such systems normally utilize limited authority series actuators that operate in response to sensors such as rate gyroscopes or vertical gyroscopes providing derived rate signals. However, as is known, when a craft utilizing such a system executes a maneuver large errors can exist within the stability augmentation system which can cause the series actuator to saturate. This results in an abrupt change in the aircraft's handling characteristics. Although this problem is common to both helicopter and fixed wing stability augmentation systems, changes in handling characteristics are much more noticeable in a helicopter because a helicopter is inherently unstable and difficult to fly. In a helicopter, the stability augmentation system typically relies on a signal from the cyclic pitch stick position transducer and from a vertical gyroscope to drive a limited authority series actuator (short throw hydraulic or electric servo). The series actuator makes minor corrective adjustments to the swash plate in order to stabilize the aircraft. The authority of the actuator and thus the stabilizing adjustments to the swash plate are typically on the order of ±10% of the cyclic pitch stick's authority, thus it is desirable that the series actuator remain relatively centered in its range of authority. This is not always possible as the pilot may initiate a trim change greater than the authority of the actuator thus rendering the actuator grossly uncentered and no longer within its symmetrical operating range.

It is known in the art to provide a washout circuit for generating a signal to drive the series actuator back into its centered or symmetrical operating range. The conventional washout circuit operates with a relatively slow time constant, since it is generally undesirable to have the washout circuit attempting to washout or compensate for small high frequency displacements of the series actuator generated in compensating response to air turbulence. After large trim changes or other gross maneuvers, it is necessary to quickly recenter the series actuator by placing the actuator drive circuitry in a fast washout condition. In the prior art, this was done by manually depressing a force trim release button located on the cyclic pitch stick, or by tripping detent switches which triggered the fast washout condition. The transition from slow to fast washout was often abrupt, reflected in radical changes in aircraft handling characteristics. In the fast washout condition, much shorter time constants were used so that the series actuator was quickly centered, however, the aircraft also became less stable.

In addition to triggering the fast washout condition, the force trim release button also actuated a clutch for recentering the conventional feel spring mechanism to its zero force position. The feel spring mechanism is used to impart artificial manual flight control reactions to the human pilot via the stick, as is well known. A problem with this arrangement is that when hovering, particularly at very low altitudes, it may be desirable to fly with the feel spring mechanism disengaged to improve the pilot's reaction time. But with the feel spring mechanism disengaged, it is no longer convenient to use the force trim release button to actuate the fast washout condition. Thus there is a need for a washout circuit which operates automatically and not associated with the force trim release mechanism. Furthermore, it is desirable that the washout make a gradual transition from slow to fast so that abrupt changes in aircraft response are eliminated.

SUMMARY OF THE INVENTION

The present invention provides an adaptive washout for automatically recentering an actuator, such as a series actuator, of a stability augmentation system. The washout time constant is continuously variable as a function of actuator displacement or attitude error. The invention comprises an error sensing means responsive to an attitude sensor such as a rate gyroscope or vertical gyroscope, and also responsive to a position sensor coupled to a conventional pilot operated maneuver control system, such as a control stick. The error signal is applied to a limited authority series actuator of the stability augmentation system which in turn adjusts a control surface to stabilize the craft. A washout circuit provides a washout signal of opposite polarity to the error signal and of a variable magnitude depending on the relative displacement of the series actuator. The invention further comprises a means for controlling the magnitude of the washout signal in accordance with displacement of the actuator so that the magnitude increases as the actuator approaches the limits of its authority or its capacity. The washout circuit thereby provides a gradually increasing washout gain, or in other words, a gradually decreasing washout time constant, for relatively large amplitude error signals which would otherwise drive the series actuator towards the limits of its authority and into saturation.

DESCRIPTION OF THE PREFERRED EMBODIMENT

The present invention is applicable to a wide variety of navigable craft having numerous types of limited authority stabilization systems as well as a wide variety of long term reference sources. For purposes of description, the invention will be explained in terms of a helicopter a stability augmentation system (SAS) with a limited authority series actuator for providing short term stability augmentation of the aircraft. Although the invention is applicable to the control of a plurality of aircraft types about a plurality of axes, the invention will be described with regard to one axis of the aircraft type, i.e. the pitch axis of the helicopter.

Figure 1:
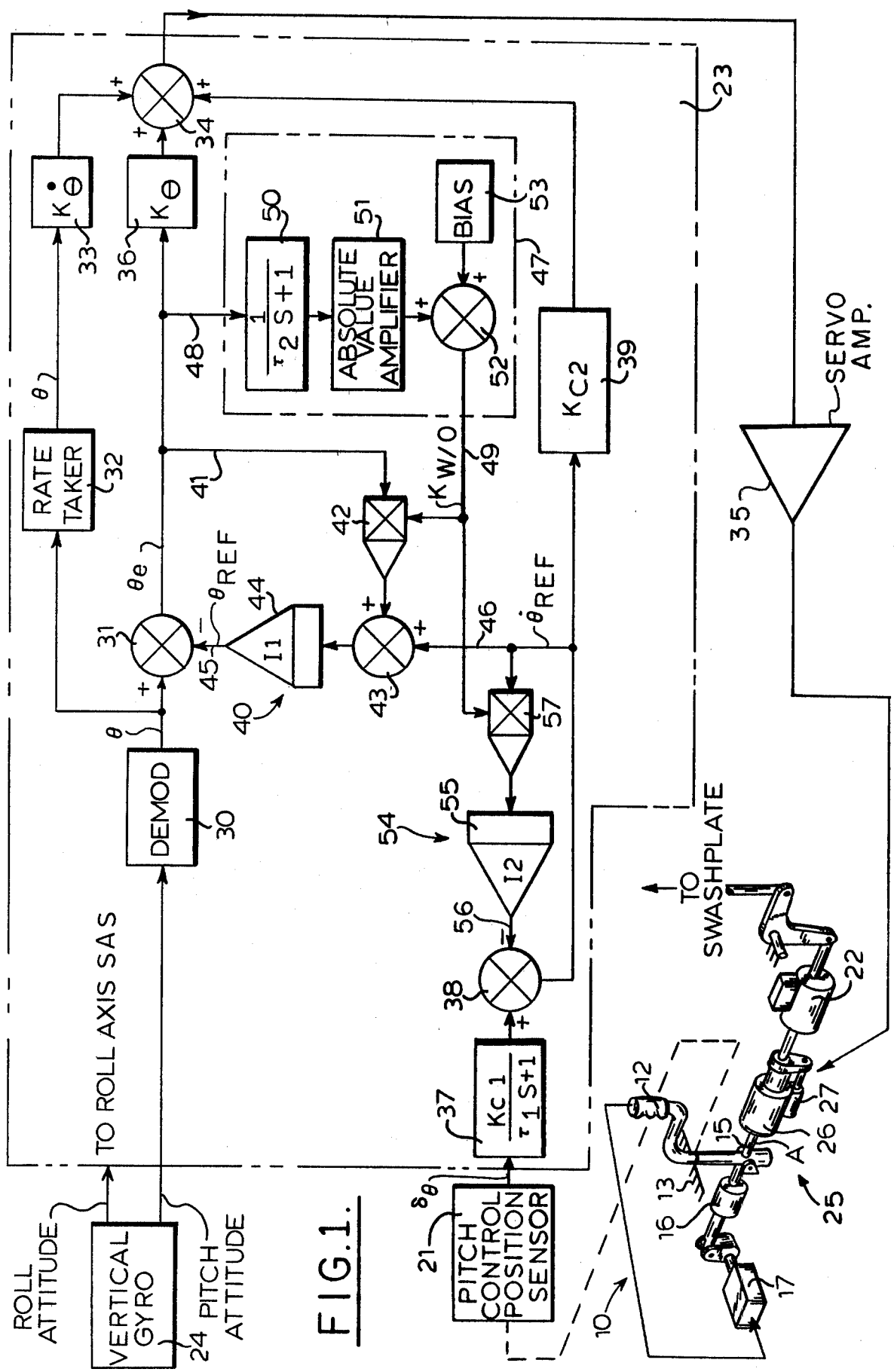
FIG. 1 is a schematic block diagram of the invention.

Referring to FIG. 1, a portion of a typical helicopter maneuver control system is illustrated at 10. The maneuver control system 10 includes a cyclic pitch stick 12 which is illustrated as schematically mounted to the helicopter airframe 13 to impart control motion to a connecting rod 15. Connected to the connecting rod 15 is a conventional feel spring mechanism 16 to impart artificial manual flight control reactions to the human pilot via the stick 12 in a well known manner. The central or zero force position for the mechanism 16 is determined in a conventional manner by a force trim release clutch mechanism 17 through appropriate linkages. The trim mechanism 17 is actuated in a well known manner by manipulation by the human pilot of a conventional force trim release button on the grip of the cyclic pitch control stick 12. A pitch control stick position sensor or transducer 21 is coupled to the control stick 12 to provide a signal representative of the displacement of the stick 12 form a central position. The output of the transducer 21 may be provided in terms of either stick force, stick displacement, or the like in a well known manner.

The output of the connecting rod 15 is applied to the input of a conventional power boost actuator 22 which, in turn, applies control motion to the helicopter swash plate via appropriate linkages.

In order to provide short term stabilization of the helicopter a stability augmentation system is included comprising stability augmentation circuit 23, a vertical gyroscope 24 and a limited authority SAS actuator 25. The limited authority actuator 25 may be of the type disclosed in U.S. Pat. No. 3,269,199 issued Aug. 30, 1966 to L. W. Deehan et al entitled "Motion Converting Mechanism" and assigned to the assignee of the present invention. The actuator 25 includes a motor 26 and a feedback device such as a potentiometer 27 that provide a signal in accordance with the position of the actuator 25. The actuator 25 is appropriately fastened to the connecting rod 15 on one end thereof and provides its output to the power boost actuator 22 at the other end thereof. It is thus appreciated that the actuator 25 is connected as a series element in the system as illustrated, but may be installed in other manners to achieve the same effect. The actuator 25 has a movable piston output which can extend and retract in such a way as to move the swashplate without moving the pilot's controls. The actuator's authority is generally small compared to that of pilot's control input. For example, the cyclic pitch stick might move a point designated by the letter A in FIG. 1, a total of 50mm when going to full aft to full forward. The actuator when going from full retract to full extend might move the same point a total of 10mm. The actuator is said to have an authority of plus or minus 10%. As is well known, it is preferable to operate the series actuator at its relatively centered position between the corresponding fully extended and fully retracted position. When the displacement of the actuator reaches one of these limits, it is said to be saturated and the aircraft's operating characteristics change dramatically.

For the pitch axis stability augmentation exemplified in FIG. 1, the vertical gyro 24 provides a pitch displacement signal or pitch attitude signal to a demodulator 30 which provides a attitude signal $\theta$ representative of the pitch attitude of the aircraft.

The pitch attitude signal $\theta$ from demodulator 30 is applied to the input of a summing junction 31 and also is applied as an input to a rate taking circuit 32 which provides an attitude rate signal $\dot{\theta}$ reflecting short term changes in the pitch attitude signal $\theta$. The output of rate taker 32 is processed through gain scaling circuitry 33 to impart a gain scale factor $K_{\dot{\theta}}$. The output of gain scaling circuit 33 is applied to the input of summing junction 34 whose output is in turn applied as an input to a conventional servo amplifier 35. The output of summing junction 31, which may be considered as representative of an attitude error $\theta_E$, is processed through a gain scaling circuit 36 which imparts a gain scale factor of $K_\theta$ to the attitude error signal. This gain scaled attitude error signal is applied to the input of summing junction 34. The output of servo amplifier 35 is applied to drive the motor 26 of the actuator 25 in the usual fashion. Thus it is appreciated that the elements 31 through 36 comprise the servo system for driving the actuator 25 in accordance with pitch information derived from the vertical gyro 24.

The output of the pitch control stick position transducer 21 provides an output $\delta_\theta$ which is applied to a shaping network 37. The shaping network 37 provides lag compensation according to the transfer function shown within the block. The output of shaping network 37 is applied as an input to a summing junction 38 whose output is applied to a gain scaling circuit 39 which imparts a gain scale factor $K_{C2}$. The gain scaled output of circuit 39 is applied as an input to summing junction 34, thereby providing a direct path, subject to the parameters of shaping network 37 and gain scaling circuit 39, between the pitch control position sensor 21 and the servo amplifier 35. It will be appreciated that this direct path provides increased response sensitivity.

The invention includes a first washout circuit 40 which receives the attitude error signal $\theta_E$ via lead 41. The error signal on lead 41 is applied to the input of a multiplier circuit 42 whose output is applied as an input to a summing junction 43. The output of summing junction 43 is applied to a first integrator 44 whose output is in turn applied to a negative or inverting input 45 of summing junction 31. A signal from the output of summing junction 38 is applied via lead 46 as an input to summing junction 43. This signal, hereinafter referred to as reference signal $\dot{\theta}_{ref}$, serves as a pitch rate reference input to integrator 44.

An adaptive washout biasing circuit, or control circuit 47 receives the attitude error signal $\theta_E$ on lead 48 and provides a washout control signal $K_{w/o}$ on lead 49 which is in turn applied as an input to multiplier 42. The washout control circuit 47 comprises a shaping network 50 for providing lag compensation according to the transfer function shown within the block. The output of shaping network 50 is applied to an absolute value amplifier 51 which provides an absolute value signal in proportion to the magnitude of attitude error signal $\theta_E$. The output of absolute value amplifier 51 is applied as an input to summing junction 52 whose output is a washout control signal $K_{w/o}$ on lead 49. Also applied to summing junction 52 is a bias signal, such as a d.c. voltage, for providing a nominol washout control signal when the attitude error signal $\theta_E$ is of small magnitude.

The invention further includes a second washout circuit 54 which comprises a second integrator 55 whose output is applied to a negative or inverting input 56 of summing junction 38. A multiplier 57 receptive of the reference signal $\dot{\theta}_{ref}$ on lead 46 and also receptive of the washout control signal $K_{w/o}$ provides a control signal to the integrator 55 of the second washout circuit.

According to the usual practice, the error sensing circuit including summing junction 31 is provided with a reference signal $\dot{\theta}_{ref}$ at the negative or inverting terminal 45 thereof. This is needed to assure that the stability augmentation system will not countermand the pilot initiated maneuvers. This reference signal is produced by integrating the reference signal $\theta_{ref}$ on line 46 through integrator 44, and in practice the parameters ($K_{C1}$, $K_{C2}$, and $\tau_1$) of shaping network 37 and scaling circuit 39 are selected such that for most maneuvers the reference signal $\theta_{ref}$ is equal to the pitch attitude signal $\theta$. Thus for most maneuvers, the error signal $\theta_e$ is equal to zero. This achieves the desired result of inhibiting any sensed attitude changes from opposing the pilot selected maneuver. Furthermore, because the attitude error signal $\theta_e$ on lead 48 is at or near zero during most maneuvers, the washout control signal $K_{w/o}$ on line 49 is dominated by the bias voltage 53.

It will be seen that the series actuator 26 is driven by servo amplifier 35 in response to the attitude error signal $\theta_e$. Thus the attitude error signal is a measure of the actuator displacement. Furthermore, since the attitude error signal $\theta_e$ is applied to the washout control circuit 47 on lead 48, the washout control signal on lead 49 is dependent on the attitude error. The washout control signal $K_{w/o}$ may be seen as directly affecting the washout gain of washout circuits 40 and 54 in the sense that increasing the control signal tends to increase the washout rate from a relatively slow washout condition to a relatively fast washout condition. The washout gain parameter is often expressed in terms of its reciprocal $1/K_{w/o}$, called the washout time constant.

Figure 2:
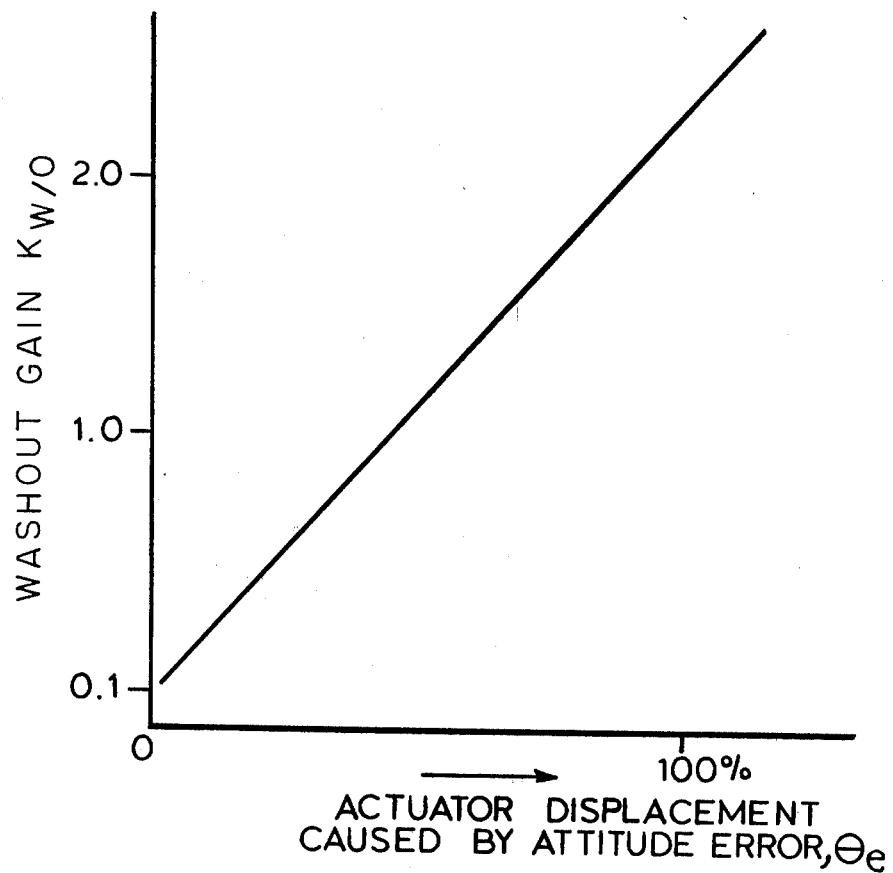
FIG. 2 is graph showing the relationship between washout gain and actuator displacement.

Referring to FIG. 2, the magnitude of the washout gain is plotted along the abscissa as a function of actuator displacement. From FIG. 2 it will be seen that for zero actuator displacement, that is for zero attitude error, the washout gain takes on a nominal value as provided by the bias voltage 53. This nominal value may be, for example, 0.1 sec.$^{-1}$. In terms of the washout time constant this nominal washout gain corresponds to a washout time constant on the order of 10 seconds. In this slow washout condition any short term displacement of the aircraft about the relevant axis, due to gusting winds for example, will be sensed by the vertical gyro 24, which will in turn produce a non-zero attitude error $\theta_e$ and attitude rate $\dot{\theta}$. This will cause the servo amplifier to drive the linear actuator 26 in a well known manner to compensate for the gust and retrim the craft. The shaping network 50 is selected to have lag compensation parameters which will filter out the short term attitude error signals, as caused by gusting winds for example. Thus the washout control circuit 47 is relatively insensitive to such short term attitude error signals. For example, the shaping network 50 may have lag delays of approximately ½ to 1 second, or in other words, a non-zero attitude error condition exists for longer than ½ to 1 second for the washout control circuit to substantially effect any change in the washout gain or time constant. Should a sustained attitude error signal exist, due to a minor trim change for example, the servo amplifier 35 will initially drive the actuator 26 off center from its reference position. However, washout circuit 44 begins to inject a signal of opposite polarity to the attitude error signal which ultimately drives the actuator back towards its centered position.

The attitude error signal $\theta_e$ is multiplied by the washout control signal $K_{w/o}$ in multiplier 42. It will be appreciated that the product thus formed is proportional to the square of the attitude error signal $\theta_e$ and has the same sense of polarity as the attitude error signal. Integrating this product through integrator 44 produces a washout signal which increases in magnitude according to the integration process, while retaining the same sense of polarity of the attitude error signal. This washout signal is then subtracted from the error signal in summing junction 31. Thus it will be seen that the washout signal acting through summing junction 31 opposes the polarity of the error signal. Because the magnitude of the washout signal is essentially proportional to the square of the error signal, the washout signal dominates, thereby repositioning the series actuator 26 towards its centered or referenced position.

To assure that the pilot selected maneuvers are not countermanded by the stability augmentation system, the reference signal $\theta_{ref}$ is applied to summing junction 43. As was stated earlier, the reference signal $\theta_{ref}$ is selected so that when the pilot maneuvers the aircraft the output of integrator 44 ($\theta_{ref}$) is equal to the pitch attitude $\theta$. This is accomplished by properly selecting the constants $K_{C1}$, $K_{C2}$, and $\tau_1$ according to well known linear aircraft models. However, as is also well known, for gross maneuvers such as steep banked turns, or during large power changes such as changing the throttle setting or changing the collective pitch stick setting, the above mentioned parameters may no longer be adequate to assure that the error signal $\theta_e$ remains at or near zero. This results in large attitude errors which, if remained unchecked, will saturate the series actuator, driving it to its displacement limits. However, before this can occur the large attitude signal $\theta_e$ is sensed by the washout control circuit control 47 which provides an increased washout signal according to FIG. 2. Because of the non-linear, or square law effect of the multiplier 42 a washout signal is generated having a much shorter time constant which quickly recenters the series actuator 26. It will be seen that the washout control signal $K_{w/o}$ is also applied to the second washout circuit 54 so that the pitch control position signal $\delta_\theta$ is synchronized to the new trim position. For example, should the pilot drop the collective stick (not shown) which will cause the aircraft to nose down, certain cross coupling effects require that the cyclic pitch stick 12 be adjusted to produce an aft cyclic signal $\delta_\theta$. However, the pitch attitude $\theta$ is not changing and therefore the referenced signal $\theta_{ref}$ resulting from the aft cyclic signal $\delta_\theta$, will tend to saturate the series actuator unless washed out by washout circuit 54.

Thus it will be seen that the present invention provides a circuit for automatically reducing the effective system washout time constant $1/K_{w/o}$ as a function of attitude error. While the circuit has been explained in terms of analog block diagram elements, in practice digital circuit techniques may be implemented. Furthermore while FIG. 2 exemplifies a typical washout gain versus attitude error function, the specific gain values and the slope of the resulting function may vary from aircraft to aircraft. In this regard, FIG. 2 illustrates the general principles namely, that for small errors and for disturbances of sufficiently high frequency so as to be filtered by the compensation network 50, the system washout time constants are slow. This provides the needed low frequency bandwidth necessary for good stability under typical gusting conditions. On the other hand, should a pilot initiate a maneuver to cause a large attitude error to exist, the circuit smoothly reduces the time constants to keep the actuators from saturating.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. In a stability augmentation system for navigable craft including a body mounted attitude sensor for providing an attitude signal representing motion of said craft about an axis thereof, actuator means responsive to an error signal derived from said attitude signal for stabilizing said craft said axis, said actuator means having a limited displacement capacity from a reference position and tending to reach the limit of said displacement capacity in response to large amplitude error signals, and maneuver control means for maneuvering said craft about said axis, an apparatus for preventing said actuator means for reaching said limit comprising:

error sensing means responsive to said attitude signal and to said maneuver control means for providing said error signal for driving said actuator means, first washout means coupled to said actuator means for providing a first washout signal of opposite polarity to said error signal and of variable magnitude and time constant to thereby reposition said actuator means towards said reference position, and control means providing a control signal for controlling the magnitude and time constant of said first washout signal in accordance with the displacement of said actuator means, said control signal causing said magnitude to increase and said time constant to decrease as said displacement approaches said limit.

2. The apparatus of claim 1 wherein said control means includes means responsive to said error signal for algebraically combining a signal in proportion to the magnitude of said error signal and a predetermined bias signal to derive said control signal.

3. The apparatus of claim 2 wherein said signal in proportion to the magnitude of said error signal comprises an absolute value signal.

4. The apparatus of claim 2 wherein said control means includes means for providing said bias signal to said combining means for providing a predetermined minimal value of said control signal.

5. The apparatus of claim 1 wherein said control means includes first lag compensation means responsive to said error signal for filtering out short term altitude error signals.

6. The apparatus of claim 1 further comprising first multiplier means responsive to said error signal and to said control signal for providing a first product signal to said fist washout means for varying the magnitude of said first washout signal.

7. The apparatus of claim 1 further comprising position sensing means coupled to said maneuver control means for providing a positional signal to said first washout means.

8. The apparatus according to claim 7 further comprising gain scaling means for providing said positional signal to said actuator means.

9. The apparatus of claim 7 further comprising second washout means responsive to said control signal for providing a second washout signal of variable magnitude and time constant of opposite polarity to that of said positional signal and means for providing the algebraic sum of said washout and positional signals to said maneuver control means.

10. The apparatus of claim 7 further comprising means for algebraically combining said positional signal and said first product signal for providing a positional reference signal to said first washout means.

11. The apparatus according to claim 7 further comprising second lag compensation means responsive to said positional signal for providing a positional reference signal to said first washout means.

12. The apparatus according to claim 9 further comprising second multiplier means responsive to said positional signal and to said control signal for providing a second product signal for varying the magnitude of said second washout signal.

* * * * *